US008720074B2

(12) United States Patent
Amor (10) Patent No.: US 8,720,074 B2
(45) Date of Patent: May 13, 2014

(54) ROBOTIC LEVELING

(75) Inventor: Miguel Amor, Thornton, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 215 days.

(21) Appl. No.: 13/312,287

(22) Filed: Dec. 6, 2011

(65) Prior Publication Data
US 2013/0139395 A1 Jun. 6, 2013

(51) Int. Cl.
*G01C 9/06* (2006.01)
(52) U.S. Cl.
USPC ............................................. 33/290; 33/294
(58) Field of Classification Search
USPC .................. 33/290, 291, 293, 294; 702/166
See application file for complete search history.

(56) References Cited

U.S. PATENT DOCUMENTS

| | | | | |
|---|---|---|---|---|
| 4,820,041 | A * | 4/1989 | Davidson et al. | 356/3.12 |
| 5,457,890 | A * | 10/1995 | Mooty | 33/294 |
| 5,537,200 | A | 7/1996 | Kumagai et al. | |
| 5,671,160 | A * | 9/1997 | Julian | 702/94 |
| 5,894,344 | A * | 4/1999 | Tamez et al. | 356/4.08 |
| 6,023,326 | A | 2/2000 | Katayama et al. | |
| 6,034,722 | A | 3/2000 | Viney et al. | |
| 6,035,254 | A | 3/2000 | Nichols | |
| 6,055,046 | A * | 4/2000 | Cain | 356/141.1 |
| 6,237,235 | B1 | 5/2001 | Feist et al. | |
| 7,215,430 | B2 | 5/2007 | Kacyra et al. | |
| 7,307,710 | B2 | 12/2007 | Gatsios et al. | |
| 7,373,725 | B1 * | 5/2008 | Vanneman et al. | 33/293 |
| 7,423,742 | B2 | 9/2008 | Gatsios et al. | |
| 7,503,123 | B2 * | 3/2009 | Matsuo et al. | 33/290 |
| 7,554,653 | B2 | 6/2009 | Magnusson | |
| 7,644,502 | B2 | 1/2010 | Arne | |
| 7,644,505 | B2 * | 1/2010 | Zeng et al. | 33/293 |
| 7,946,044 | B2 | 5/2011 | Kludas et al. | |
| 7,947,944 | B2 | 5/2011 | Talbot | |
| 7,969,586 | B2 * | 6/2011 | Donath et al. | 356/630 |
| 8,060,344 | B2 | 11/2011 | Stathis | |
| 8,151,474 | B2 * | 4/2012 | Kumagai et al. | 33/290 |
| 2002/0162233 | A1 * | 11/2002 | El-Katcha et al. | 33/293 |
| 2010/0088910 | A1 * | 4/2010 | Svanholm et al. | 33/290 |
| 2012/0186088 | A1 * | 7/2012 | Amor | 33/228 |

FOREIGN PATENT DOCUMENTS

| | | |
|---|---|---|
| DE | 19845364 C5 | 7/2005 |
| WO | WO 2004/057269 A1 | 7/2004 |
| WO | WO 2008/014813 A1 | 2/2008 |

OTHER PUBLICATIONS

International Search Report and Written Opinion for PCT Application No. PCT/US12/67876, mailed on Mar. 4, 2013, 11 pages.

* cited by examiner

*Primary Examiner* — Christopher Fulton
(74) *Attorney, Agent, or Firm* — Kilpatrick Townsend & Stockton LLP (57) ABSTRACT

A method of determining an elevation of a point relative to a leveling instrument includes sending a first signal from a controller to the leveling instrument using a wireless link. The first signal indicates to the leveling instrument to automatically align an alignment unit of the leveling instrument with a reference target of a leveling staff. The method also includes receiving a second signal at the controller using the wireless link. The second signal is sent from the leveling instrument and indicates that the alignment unit is aligned with the reference target. The method also includes sending a third signal from the controller to the leveling instrument using the wireless link. The third signal indicates to the leveling instrument to automatically determine the elevation of the point relative to the leveling instrument.

17 Claims, 7 Drawing Sheets

FIG. 7

ROBOTIC LEVELING

FIELD OF INVENTION

Embodiments of the present invention relate generally to robotic leveling instruments. More particularly, embodiments of the present invention relate to methods of using robotic leveling instruments for elevation measurements.

BACKGROUND

Various instruments are commonly employed in surveying, construction, and other applications to measure angles, distances, and elevations. As an example, digital levels are commonly used to provide high-accuracy elevation measurements. Using a digital level, an elevation of an unknown point can be determined relative to the digital level or relative to a known point. A typical leveling procedure involves determining an elevation of the digital level relative to a known point (i.e., a backsight measurement), and determining an elevation of the digital level relative to an unknown point (i.e., a foresight measurement). The difference in elevation between the points can be used to determine the elevation of the unknown point.

At each point the digital level determines a difference in elevation between a horizontal line of sight of the digital level and a measurement point. This is done using a leveling staff. The digital level is used to determine where its horizontal line of sight falls on the leveling staff, and a scale on the leveling staff is used to determine a distance between the horizontal line of sight and the measurement point.

Typical leveling procedures require one person to hold a leveling staff at a measurement point and another person to perform measurements at a digital level. To decrease measurement time, some procedures require two people to hold leveling staffs—one for a backsight measurement and one for a foresight measurement.

While digital levels are commonly used to determine elevation, improved methods are desired to increase measurement accuracy, reduce measurement time, and lower measurement costs.

SUMMARY

Embodiments of the invention provide improved methods for determining elevation. For example, in accordance with an embodiment of the invention, a method of determining an elevation of a point relative to a leveling instrument includes sending a first signal from a controller to the leveling instrument using a wireless link. The first signal indicates to the leveling instrument to automatically align an alignment unit of the leveling instrument with a reference target of a leveling staff. The method also includes receiving a second signal at the controller using the wireless link. The second signal is sent from the leveling instrument and indicates that the alignment unit is aligned with the reference target. The method also includes sending a third signal from the controller to the leveling instrument using the wireless link. The third signal indicates to the leveling instrument to automatically determine the elevation of the point relative to the leveling instrument. The elevation of the point is determined using a pattern on the leveling staff.

In an embodiment, the leveling instrument is positioned less than about 100 meters from the point.

In another embodiment, the elevation of the point relative to the leveling instrument is determined within an accuracy range of less than ±0.2 millimeters when the leveling instrument is positioned less than 100 meters from the point.

In another embodiment, the alignment unit is configured to rotate independently about a horizontal axis of the leveling instrument.

In another embodiment, the method also includes receiving a fourth signal at the controller using the wireless link. The fourth signal is sent from the leveling instrument and provides the elevation of the point relative to the leveling instrument.

In another embodiment, the leveling instrument comprises a digital level.

In yet another embodiment, the alignment unit of the leveling instrument performs a scan to identify the reference target of the leveling staff and align the alignment unit with the reference target. In some embodiments, the reference target includes an optical pattern, and the scan that is performed to identify the reference target of the leveling staff is an optical scan to identify the optical pattern. In other embodiments, the reference target includes a reflective portion, and the leveling instrument emits light and detects light reflected from the reflective portion of the reference target during the scan.

In accordance with another embodiment of the invention, a method of determining an elevation of a point relative to a leveling instrument includes automatically tracking movement of a leveling staff by the leveling instrument as the leveling staff is moved from a first location to the point. The method also includes receiving a first signal at the leveling instrument using a wireless link. The first signal indicates to the leveling instrument to align an alignment unit of the leveling instrument with a reference target of the leveling staff. The method also includes automatically aligning the alignment unit of the leveling instrument with the reference target of the leveling staff. The method also includes sending a second signal from the leveling instrument using the wireless link. The second signal indicates that the alignment unit is aligned with the reference target of the leveling staff. The method also includes receiving a third signal at the leveling instrument using the wireless link. The third signal indicates to the leveling instrument to determine the elevation of the point relative to the leveling instrument. The elevation of the point is determined using a pattern on the leveling staff.

In an embodiment, the leveling instrument tracks movement of the leveling staff by tracking movement of the reference target.

In another embodiment, the reference target includes a reflective portion, and the leveling instrument emits light and detects light reflected from the reflective portion to track movement of the leveling staff.

In accordance with yet another embodiment of the invention, a method of determining an elevation of a point relative to a leveling instrument includes sending a first signal from a controller to the leveling instrument using a wireless link. The first signal indicates to the leveling instrument to automatically track movement of a reference target of a leveling staff as the leveling staff is moved from a first location to the point. The method also includes sending a second signal from the controller to the leveling instrument using the wireless link. The second signal indicates to the leveling instrument to automatically align an alignment unit of the leveling instrument with the reference target of the leveling staff, and also indicates to the leveling instrument to automatically determine the elevation of the point relative to the leveling instrument. The elevation of the point is determined using a pattern on the leveling staff. The method also includes receiving a third signal at the controller using the wireless link. The third signal is sent from the leveling instrument and provides the elevation of the point relative to the leveling instrument.

In an embodiment, the method also includes receiving a fourth signal at the controller using the wireless link. The fourth signal is sent from the leveling instrument and indicates that the alignment unit is aligned with the reference target of the leveling staff.

In another embodiment, an elevation of a second point is determined relative to the leveling instrument using a second leveling staff different from the leveling staff. The second leveling staff is positioned at the second point and the leveling instrument is positioned remote from the second point. The method includes sending a fourth signal from the controller to the leveling instrument using the wireless link. The fourth signal indicates to the leveling instrument to automatically align the alignment unit with a reference target of the second leveling staff, and also indicates to the leveling instrument to automatically determine the elevation of the second point relative to the leveling instrument. The elevation of the second point determined using a pattern on the second leveling staff.

Numerous benefits are achieved using embodiments of the invention over conventional techniques. In some embodiments, for example, a controller sends signals to a leveling instrument to automatically align with a leveling staff and to automatically obtain elevation measurements. Using these methods, a single person can obtain high-accuracy elevation measurements. This can improve efficiency over conventional methods that require at least two people to perform elevation measurements. Also, some embodiments include automatically tracking movement of a leveling staff by a leveling instrument. This can reduce set up time at each point thus reducing measurement time and cost. Depending upon the embodiment, one or more of these benefits may exist. These and other benefits are described throughout the specification and more particularly below.

DETAILED DESCRIPTION

Embodiments of the present invention provide methods of determining elevation with increased efficiency over conventional techniques. Some embodiments include sending signals to a leveling instrument using a controller that is located remote from the leveling instrument. The signals may indicate to the leveling instrument to align with a leveling staff and to automatically perform elevation measurements. Other embodiments may include automatically tracking movement of the leveling staff by the leveling instrument.

As used herein, a leveling instrument may include a digital level or similar device that performs leveling measurements using a leveling staff. The leveling staff typically includes a pattern (e.g., a bar code) that is recognized by the leveling instrument and includes a measurement scale. The pattern may also be used for tracking and/or aligning the leveling instrument with the leveling staff. Alternatively, the leveling staff may include a reference target that can be used for tracking and/or aligning. The pattern may also include additional information such as an identifier that can be used to identify the leveling staff or associate the leveling staff with a particular point or location.

Embodiments of the present invention enable a single person to efficiently obtain elevation measurements without sacrificing measurement accuracy. Leveling instruments in accordance with embodiments of the invention provide elevation measurements having an accuracy range of about ±0.2 millimeters when the leveling instrument is positioned less that about 100 meters from the leveling staff. This accuracy is sufficient for most applications including high-speed railways.

Figure 1:
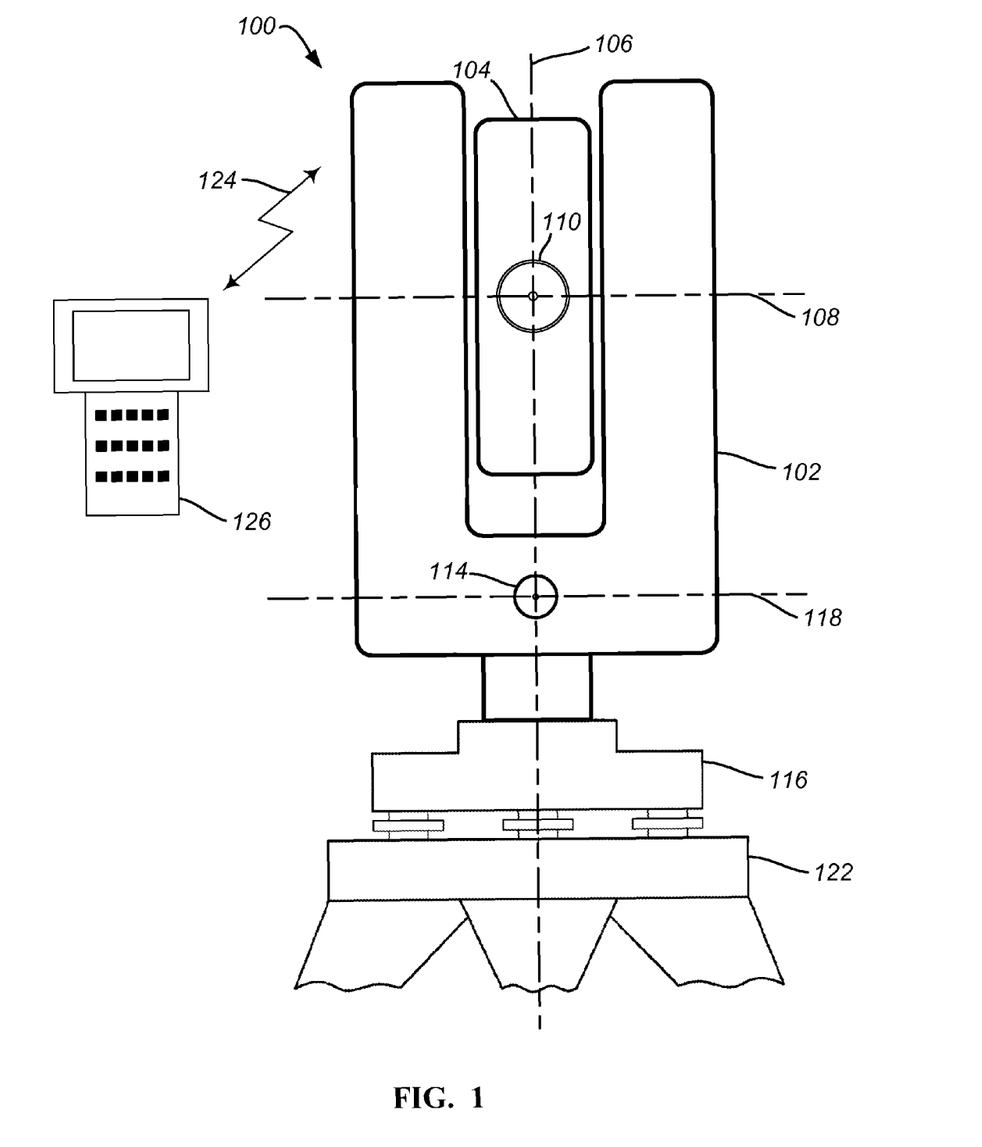
FIGS. 1-3 are simplified diagrams of exemplary leveling instruments that may be used to determine elevation in accordance with various embodiments of the present invention.

FIG. 1 is a simplified diagram of an exemplary leveling instrument 100 that may be used to determine an elevation of a point in accordance with embodiments of the invention. The leveling instrument 100 includes a housing 102 mounted on an adjustable tribrach 116. The adjustable tribrach 116 is mounted on a support 122 such as a tripod (only a portion of which is shown in FIG. 1). The adjustable tribrach 116 is typically configured to allow rotation of the housing 102 about a vertical axis 106. The vertical axis 106 can be aligned such that it is parallel with a local gravity vector in accordance with known techniques.

The housing 102 includes a measurement unit 114. The measurement unit 114 may include optics that enable viewing of an object and/or an imaging device that enables capturing of image information. A center of the measurement unit 114 is typically positioned at an intersection of the vertical axis 106 and an elevation axis 118 (although this is not required). The elevation axis 118 is typically orthogonal to the vertical axis 106.

The measurement unit 114 may be configured in a manner similar to a conventional digital level to perform elevation measurements. The measurement unit 114 and/or the housing 102 may include a compensator (e.g., a pendulum) to ensure alignment of the measurement unit 114 with a local gravity vector. The measurement unit 114 may also include an image sensor (e.g., a CCD or CMOS array) configured to obtain image information associated with a pattern on a leveling staff. The image information may be used to determine elevation in accordance with known techniques. For example, the measurement unit 114 may be aligned with a leveling staff and image information may be obtained at an intersection between a horizontal line of sight of the measurement unit 114 and the leveling staff. A pattern on the leveling staff may include a measurement scale, and the image information may indicate a particular measurement on the scale. The image information is used to determine a difference in height between the object or point of interest and the horizontal line of sight of the leveling instrument 100.

The leveling instrument 100 also includes an alignment unit 104. In this example, the alignment unit 104 can rotate independently about a horizontal axis 108. The horizontal axis 108 may be orthogonal to the vertical axis 106 and parallel to the elevation axis 118 (although this is not required). In this embodiment, the alignment unit 104 is rotatable about horizontal axis 108 to any desired vertical angle, and the housing 102 is rotatable about the vertical axis 106 to any desired horizontal angle.

The alignment unit 104 includes a tracker/aligner 110. A center of the tracker/aligner 110 may be aligned with the vertical axis 106 and the horizontal axis 108 (although this is not required). The tracker/aligner 110 and the measurement unit 114 are arranged such that when the tracker/aligner 110 is aligned with a leveling staff (or a reference target of a leveling staff), the measurement unit 114 is aligned with the leveling staff and in a position to perform elevation measurements using the leveling staff. The tracker/aligner 110 may be configured to automatically track a leveling staff (or a reference target of a leveling staff), automatically perform a scan to locate a leveling staff (or a reference target of a leveling staff), and/or automatically align with a leveling staff (or a reference target of a leveling staff).

The tracker/aligner 110 may be any conventional device that is capable of performing tracking, scanning, and/or aligning functions. As example, in some embodiments the tracker/aligner 110 includes an imaging device (e.g., a digital camera) configured to recognize a pattern on a leveling staff (or a reference target of a leveling staff). In other embodiments, the tracker/aligner 110 includes a module configured to receive signals (e.g., pulses of light) emitted from a reference target of a leveling staff. In yet other embodiments, the tracker/aligner 110 includes a module configured to emit signals and receive signals that are reflected from a reference target of a leveling staff. The tracking, scanning, and/or aligning functions performed by these devices may be in accordance with known techniques.

Independent rotation of the alignment unit 104 about the horizontal axis 108 allows the tracker/aligner 110 to track, scan, and/or align at virtually any vertical angle while the measurement unit 114 remains in a measurement position substantially orthogonal to the local gravity vector. This allows the tracker/aligner 110 to track, scan, and/or align with a leveling staff that may be outside a limited measurement window of the measurement unit 114.

The leveling instrument 100 also includes a controllable horizontal drive used to rotate the housing 102 about the vertical axis 106 and a controllable vertical drive used to rotate the alignment unit 104 about the horizontal axis 108. The horizontal and vertical drives are configured to provide rotation about axes 106, 108 in response to control signals.

In an embodiment, the control signals are provided by a processor within the leveling instrument 100. The processor is configured to control the horizontal and vertical drives to rotate the housing 102 and the alignment unit 104. The processor may also be configured to control automatic tracking, scanning, and alignment of the tracker/aligner 110 as well as automatic elevation measurements of the measurement unit 114. Configuration of the processor to control these functions may be in accordance with known techniques.

The leveling instrument 100 also includes a communications module configured to provide wireless communications of data and commands by sending signals 124 between the processor and a controller 126. The controller 126 may be a handheld controller with a screen for displaying information and a keypad or other means for inputting data and/or commands. A user can use the controller 126 to remotely control the various functions (e.g., tracking, scanning, aligning, measuring) of the leveling instrument 100.

The leveling instrument 100 may also include an optical plummet to facilitate positioning of the leveling instrument 100 over a survey monument or other selected point in accordance with known techniques. The optical plummet may emit a light beam vertically downward that is coaxial with the vertical axis 106 and/or the optical plummet may enable alignment with a selected point using a telescope or similar alignment device.

The leveling instrument 100 may also include an inclination detector that supplies a signal representing inclination of the housing 102 and/or the measurement unit 114 in two mutually-orthogonal directions. The inclination detector can be used to set up the leveling instrument 100 so that the vertical axis 106 is plumb. The inclination detector may also be used to automatically compensate for any deviations.

It should be appreciated that the leveling instrument 100 is presented herein merely as an exemplary leveling instrument that may be used to determine an elevation of a point in accordance with the various embodiments of the invention. It is not intended that embodiments of the invention be limited to the configuration illustrated in FIG. 1 and/or described above. It is recognized that leveling instruments having different configurations may be used in accordance with the methods of the present invention and that one of ordinary skill in the art would recognize many variations, modifications, and alternatives in light of the present application.

Figure 2:
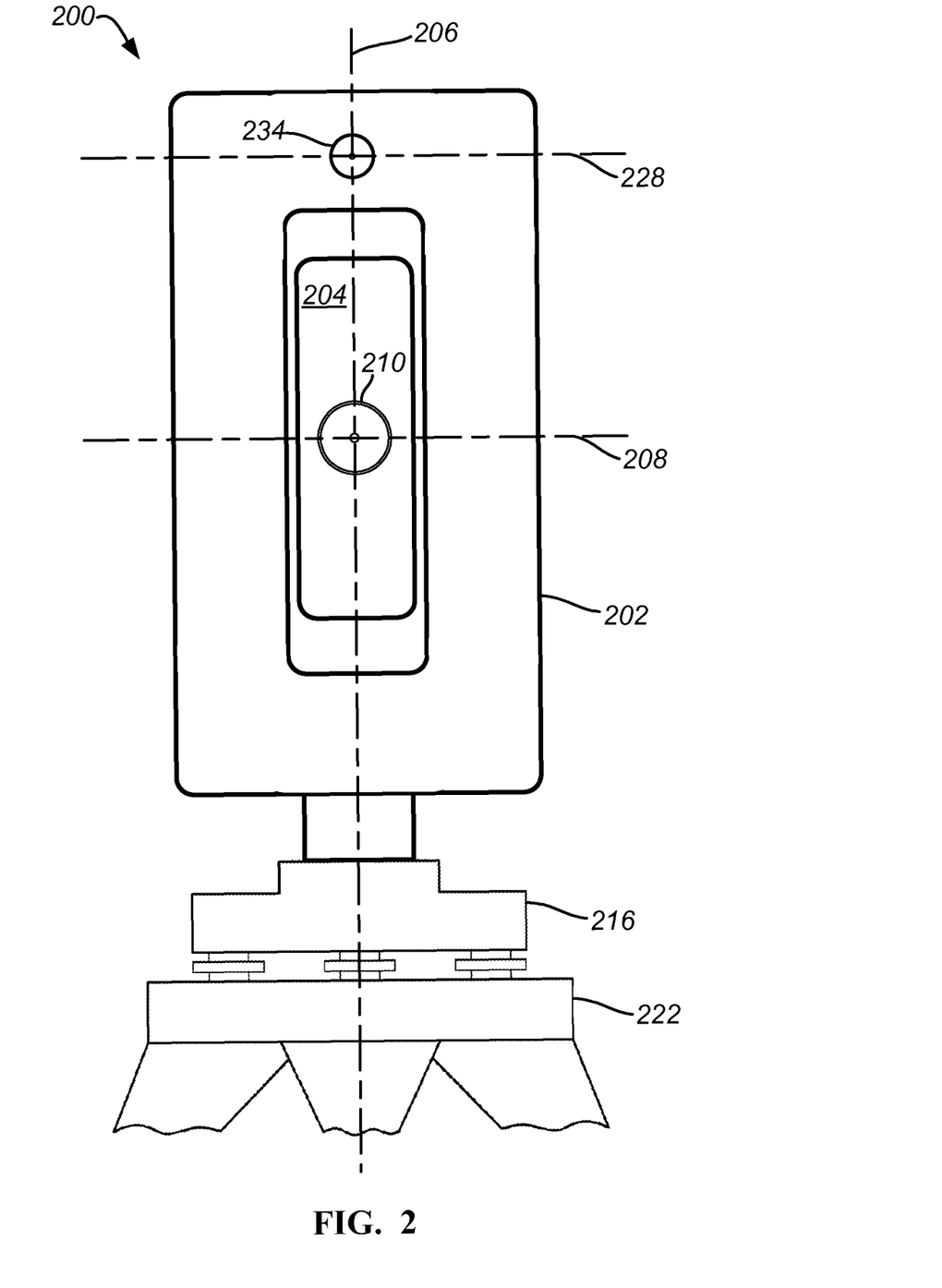

FIG. 2 is a simplified diagram of another exemplary leveling instrument that may be used to determine an elevation of a point in accordance with embodiments of the invention. The leveling instrument 200 is similar to leveling instrument 100 illustrated in FIG. 1 in that it includes a housing 202, an adjustable tribrach 216, a support 222, and an alignment unit 204 having a tracker/aligner 210. Each of these components may be configured in a manner similar to that of the leveling instrument 100 described above. Additionally, the leveling instrument 200 may include other components that may or may not have been described above with regard to the leveling instrument 100.

The leveling instrument 200 also includes a measurement unit 234. Similar to measurement unit 114 illustrated in FIG. 1, measurement unit 234 may be configured in a manner similar to a conventional digital level to perform elevation measurements. In this embodiment, however, the measurement unit 234 is disposed in an upper portion of the housing 202. Such a configuration may be advantageous to allow wireless communications with a controller using Bluetooth, Wi-Fi, or similar wireless communication technologies.

Figure 3:
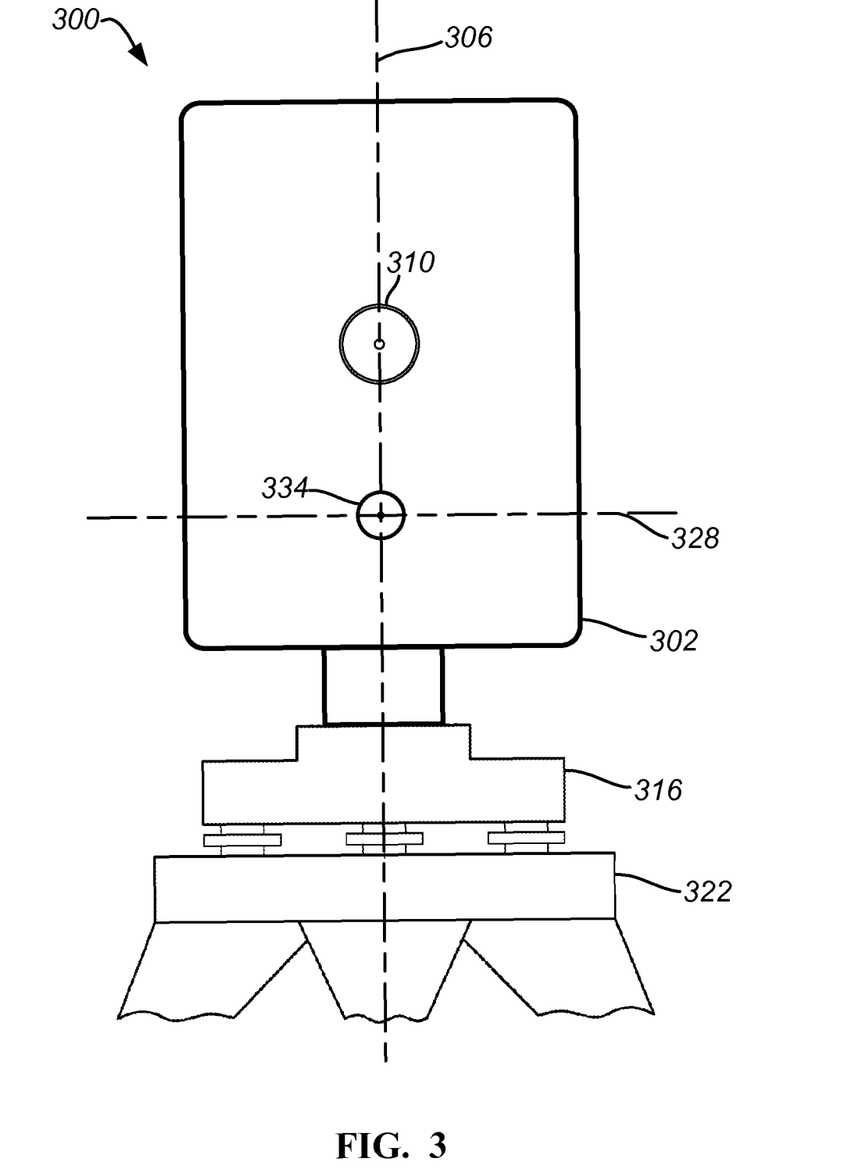

FIG. 3 is a simplified diagram of another exemplary leveling instrument that may be used to determine an elevation of a point in accordance with embodiments of the invention. The leveling instrument 300 is similar to leveling instrument 100 illustrated in FIG. 1 in that it includes a housing 302, an adjustable tribrach 316, and a support 322. Each of these components may be configured in a manner similar to that of the leveling instrument 100 described above. Additionally, the leveling instrument 300 may include other components that may or may not have been described above with regard to the leveling instrument 100.

The leveling instrument 300 also includes a tracker/aligner 310, but the tracker/aligner 310 does not rotate independently about a horizontal axis. In an embodiment, the leveling instrument 300 includes a vertical drive that rotates the housing 302 about a horizontal axis. In this embodiment, the housing 302 may rotate about the horizontal axis during tracking, scanning, and/or aligning functions performed by the tracker/aligner 310. Before performing elevation measurements using the measurement unit 334, the housing 302 is aligned with a local gravity vector. In another embodiment, the leveling instrument 300 does not include a vertical drive for rotation about a horizontal axis. In this embodiment, the housing 302 remains aligned with a local gravity vector during the tracking, scanning, and/or aligning functions.

In yet another alternative embodiment, the leveling instrument may include an integrated measurement and alignment unit. In this embodiment, the measurement and alignment unit may be configured to perform elevation measurements in a manner similar to that of measurement unit 334 in FIG. 3. The measurement and alignment unit may also include a tracker/aligner configured to perform tacking, scanning, and/or aligning functions in a manner similar to that of tracker/ aligner 310 in FIG. 3. One of ordinary skill in the art would recognize many variations, modifications, and alternatives in light of the present application.

Figure 4:
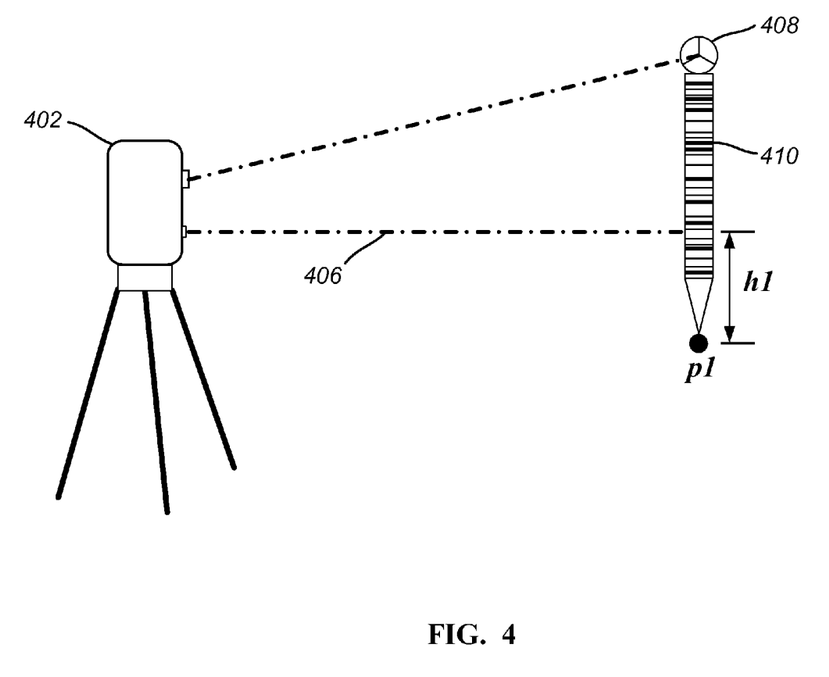
FIG. 4 is a simplified diagram illustrating a leveling instrument measuring an elevation of a point in accordance with an embodiment of the invention.

FIG. 4 is a simplified diagram of a leveling instrument 402 measuring an elevation of a point ($p_1$) in accordance with an embodiment of the invention. A leveling staff 410 is positioned vertically above the point ($p_1$), and a measurement unit of the leveling instrument 402 determines a height ($h_1$) at which a horizontal axis 406 of the leveling instrument 402 intersects the leveling staff 410. The height ($h_1$) is determined by identifying a pattern (e.g., a scale or code words) on the leveling staff 410 that is at a same height as the horizontal axis 406 of the leveling instrument 402. An elevation ($e_1$) of the point ($p_1$) can be by determined by measuring a difference in height ($h_2$) between the leveling instrument 402 and a second point at a known elevation ($e_2$) and using the equation:

$$e_1 = e_2 + h_2 - h_1 \quad \text{Equation (1)}$$

In some embodiments, the leveling staff 410 may include a reference target 408, and the leveling instrument 402 may be a robotic leveling instrument configured to perform automatic tracking, scanning, and/or aligning as explained above with regard to FIGS. 1-3.

Figure 5:
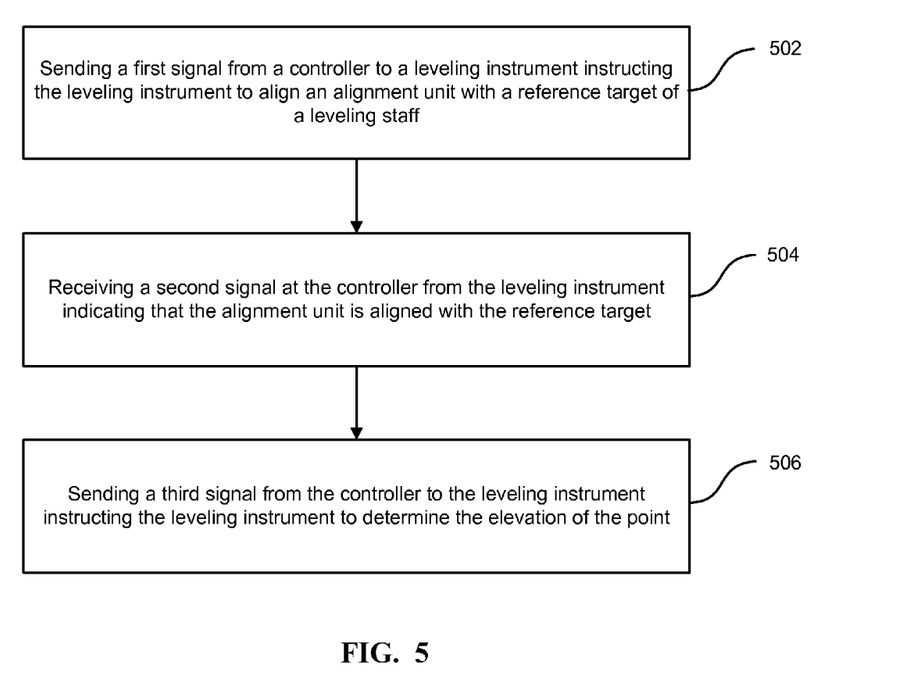
FIGS. 5-7 are simplified flowcharts illustrating exemplary methods of determining elevation in accordance with various embodiments of the invention.

FIG. 5 is a simplified flowchart illustrating an exemplary method of determining an elevation of a point relative to a leveling instrument in accordance with an embodiment of the invention. The elevation is determined using a leveling staff that is positioned at the point while the leveling instrument is positioned remote from the point. The method includes sending a first signal from a controller to the leveling instrument instructing the leveling instrument to align an alignment unit with a reference target of the leveling staff (502). The first signal may be sent using a wireless link. The alignment may be performed automatically by the leveling instrument upon receiving the first signal. In an embodiment, the alignment unit is configured to rotate independently about a horizontal axis of the leveling instrument. In another embodiment, the alignment unit performs a scan to identify the reference target and align with the reference target. The scan may identify an optical pattern of the reference target, or the scan may involve emitting light and detecting light reflected from a reflective portion of the reference target.

The method also includes receiving a second signal at the controller from the leveling instrument indicating that the alignment unit is aligned with the reference target (504). The second signal may also be sent using the wireless link.

The method also includes sending a third signal from the controller to the leveling instrument instructing the leveling instrument to determine the elevation of the point (506). The third signal may also be sent using the wireless link. The elevation may be determined automatically by the leveling instrument upon receiving the third signal. The elevation may be determined relative to the leveling instrument using a pattern on the leveling staff. In an embodiment, the method may also include receiving a fourth signal at the controller from the leveling instrument providing the elevation of the point.

Figure 6:
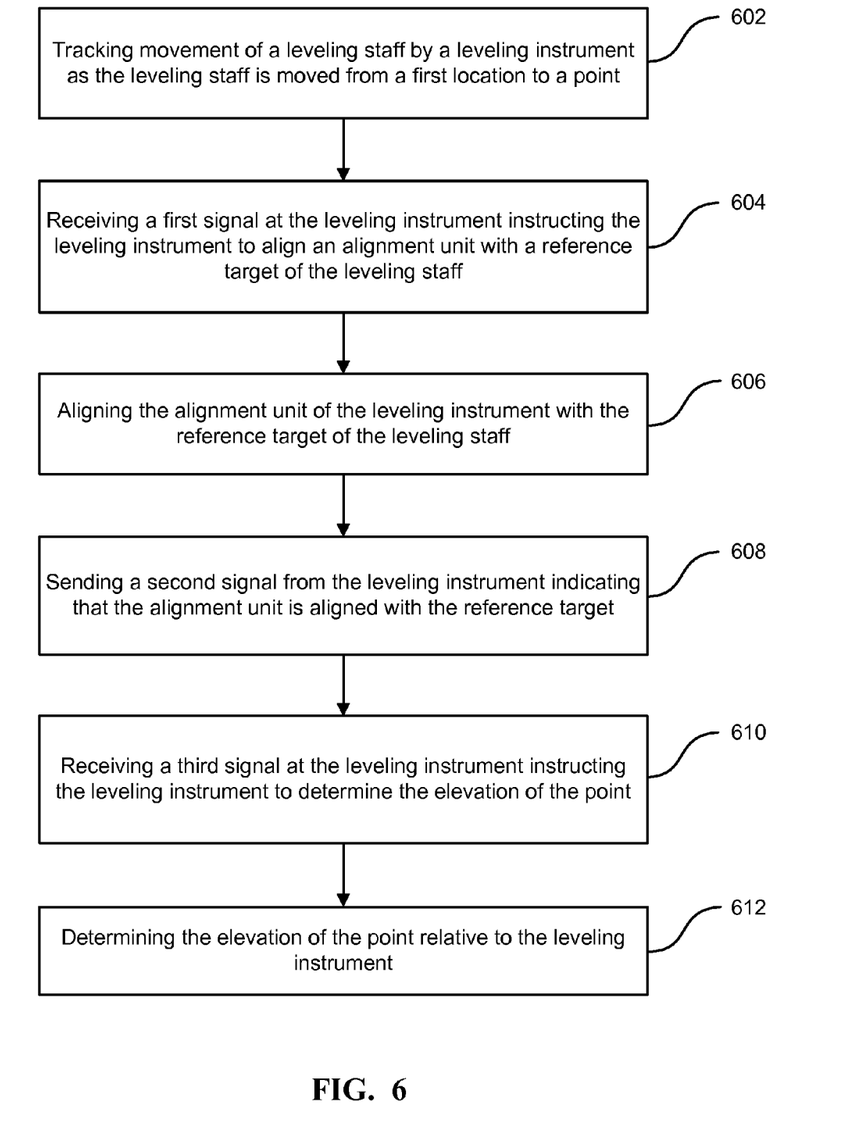

FIG. 6 is a simplified flowchart illustrating an exemplary method of determining an elevation of a point relative to a leveling instrument in accordance with another embodiment of the invention. The elevation is determined using a leveling staff that is positioned at the point while the leveling instrument is positioned remote from the point. The method includes tracking movement of the leveling staff by the leveling instrument as the leveling staff is moved from a first location to the point (602). The tracking may be performed automatically by the leveling instrument. In an embodiment, the leveling instrument tracks movement of the leveling staff by tracking movement of a reference target. In another embodiment, the leveling instrument emits light and detects light reflected from a reflective portion of the reference target to track movement of the leveling staff.

The method also includes receiving a first signal at the leveling instrument instructing the leveling instrument to align an alignment unit with a reference target of the leveling staff (604). The first signal may be sent using a wireless link.

The method also includes aligning the alignment unit of the leveling instrument with the reference target of the leveling staff (606). The alignment may be performed automatically by the leveling instrument upon receiving the first signal. In an embodiment, the alignment unit is configured to rotate independently about a horizontal axis of the leveling instrument during alignment.

The method also includes sending a second signal from the leveling instrument indicating that the alignment unit is aligned with the reference target (608). The second signal may also be sent using the wireless link.

The method also includes receiving a third signal at the leveling instrument instructing the leveling instrument to determine the elevation of the point (610). The third signal may also be sent using the wireless link.

The method may also include determining the elevation of the point (612). The elevation may be determined automatically by the leveling instrument upon receiving the third signal. The elevation may be determine relative to the leveling instrument using a pattern on the leveling staff.

Figure 7:
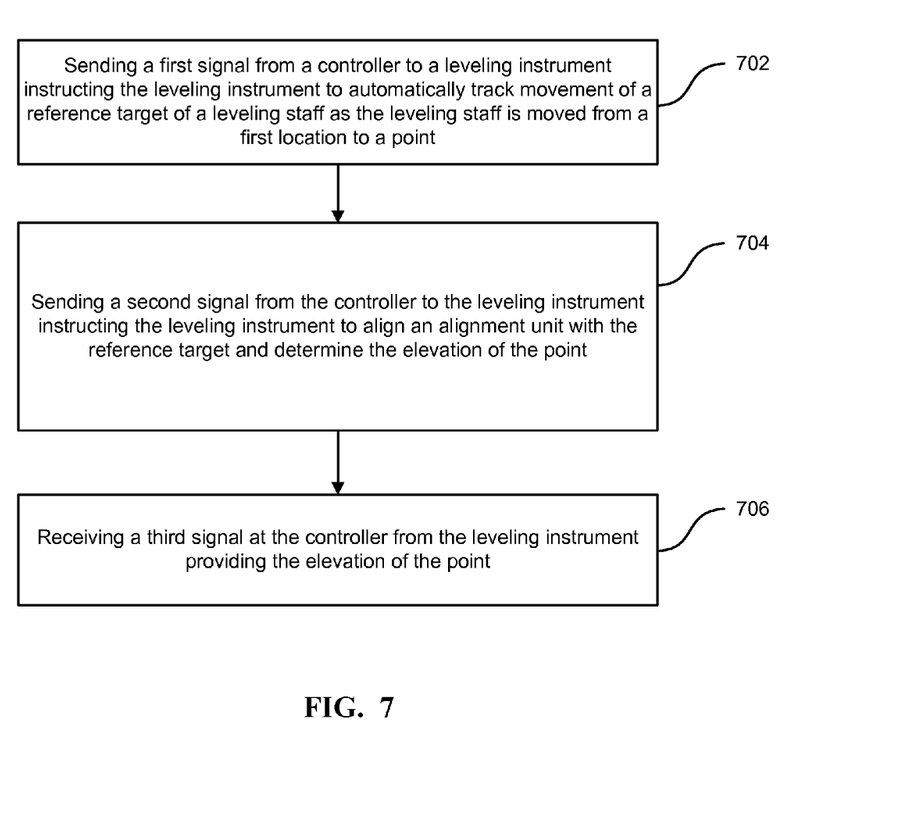

FIG. 7 is a simplified flowchart illustrating an exemplary method of determining an elevation of a point relative to a leveling instrument in accordance with yet another embodiment of the invention. The elevation is determined using a leveling staff that is positioned at the point while the leveling instrument is positioned remote from the point. The method includes sending a first signal from a controller to the leveling instrument instructing the leveling instrument to automatically track movement of a reference target of the leveling staff as the leveling staff is moved from a first location to the point (702). The first signal may be sent using a wireless link.

The method also includes sending a second signal from the controller to the leveling instrument instructing the leveling instrument to align an alignment unit with the reference target and determine the elevation of the point (704). The second signal may also be sent using the wireless link. The alignment may be performed automatically by the leveling instrument upon receiving the second signal. In an embodiment, the alignment unit is configured to rotate independently about a horizontal axis of the leveling instrument during the alignment. The elevation may be determine relative to the leveling instrument using a pattern on the leveling staff.

The method also includes receiving a third signal at the controller from the leveling instrument providing the elevation of the point (706). The third signal may also be sent using the wireless link.

In an embodiment, an elevation of a second point is determined relative to the leveling instrument using a second leveling staff different from the leveling staff. The elevation of the second point is determined while the second leveling staff is positioned at the second point and the leveling instrument is positioned remote from the point. The method further comprises sending a fourth signal from the controller to the leveling instrument using the wireless link. The fourth signal instructing the leveling instrument to automatically align the alignment unit with a reference target of the second leveling staff and automatically determine the elevation of the second point relative to the leveling instrument. The elevation of the second point is determined using a pattern on the second leveling staff.

It should be appreciated that the specific steps illustrated in FIGS. 5-7 provide particular methods of determining an elevation of a point relative to a leveling instrument in accordance with embodiments of the invention. The steps outlined above may be continuously repeated by system software. Other sequences of steps may also be performed according to alternative embodiments. For example, the steps outlined above may be performed in a different order. Moreover, the individual steps illustrated in FIGS. 5-7 may include multiple sub-steps that may be performed in various sequences as appropriate to the individual step. Furthermore, additional steps may be added or removed depending on the particular application. One of ordinary skill in the art would recognize many variations, modifications, and alternatives in light of the present application.

Leveling instruments and controllers in accordance with embodiments of the invention typically include familiar processing components such as one or more processors, tangible media for storage, I/O devices, and system buses interconnecting the components. RAM and disk drives are examples of tangible media for storage of data and computer programs. Other types of tangible media include magnetic storage media, optical storage media, semiconductor memories such as flash memory, networked storage devices, and the like. The leveling instruments and controllers may also include operating systems.

It should be noted that the methods and apparatuses discussed throughout the specification are provided merely as examples. Various embodiments may omit, substitute, or add various steps or components as appropriate. For instance, it should be appreciated that features described with respect to certain embodiments may be combined in various other embodiments. Furthermore, embodiments may be implemented by hardware, software, firmware, middleware, microcode, hardware description languages, or any combination thereof. When implemented in software, firmware, middleware, or microcode, the program code or code segments used to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other mediums capable of storing, containing, or carrying instructions or data.

What is claimed is:

1. A method of determining an elevation of a point relative to a leveling instrument using a leveling staff, the leveling staff positioned at the point and the leveling instrument positioned remote from the point, the method comprising:
    sending a first signal from a controller to the leveling instrument using a wireless link, the first signal indicating to the leveling instrument to automatically align an alignment unit of the leveling instrument with a reference target of the leveling staff, wherein the alignment unit is configured to rotate about a first horizontal axis independent of the leveling instrument, and the alignment unit and the leveling instrument are configured to rotate about a vertical axis in unison;
    receiving a second signal at the controller using the wireless link, the second signal sent from the leveling instrument and indicating that the alignment unit is aligned with the reference target of the leveling staff; and
    sending a third signal from the controller to the leveling instrument using the wireless link, the third signal indicating to the leveling instrument to automatically determine the elevation of the point relative to the leveling instrument, the elevation of the point determined by a measurement unit of the leveling instrument using a pattern on the leveling staff, wherein the measurement unit is configured to rotate about a second horizontal axis independent of the leveling instrument, the first horizontal axis being different from the second horizontal axis, and the measurement unit and the leveling instrument are configured to rotate about the vertical axis in unison.

2. The method of claim 1 wherein the leveling instrument is positioned less than about 100 meters from the point.

3. The method of claim 1 wherein the elevation of the point relative to the leveling instrument is determined within an accuracy range of less than ±0.2 millimeters when the leveling instrument is positioned less than 100 meters from the point.

4. The method of claim 1 further comprising:
    receiving a fourth signal at the controller using the wireless link, the fourth signal sent from the leveling instrument and providing the elevation of the point relative to the leveling instrument.

5. The method of claim 1 wherein the leveling instrument comprises a digital level.

6. The method of claim 1 wherein the alignment unit of the leveling instrument performs a scan to identify the reference target of the leveling staff and align the alignment unit with the reference target.

7. The method of claim 6 wherein the reference target includes an optical pattern, and the scan that is performed to identify the reference target of the leveling staff is an optical scan to identify the optical pattern.

8. The method of claim 6 wherein the reference target includes a reflective portion, and the leveling instrument emits light and detects light reflected from the reflective portion of the reference target during the scan.

9. A method of determining an elevation of a point relative to a leveling instrument using a leveling staff, the leveling staff positioned at the point and the leveling instrument positioned remote from the point, the method comprising:
    automatically tracking movement of the leveling staff by the leveling instrument as the leveling staff is moved from a first location to the point;
    receiving a first signal at the leveling instrument using a wireless link, the first signal indicating to the leveling instrument to align an alignment unit of the leveling instrument with a reference target of the leveling staff, wherein the alignment unit is configured to rotate about a first horizontal axis independent of the leveling instrument, and the alignment unit and the leveling instrument are configured to rotate about a vertical axis in unison;
    automatically aligning the alignment unit of the leveling instrument with the reference target of the leveling staff;
    sending a second signal from the leveling instrument using the wireless link, the second signal indicating that the alignment unit of the leveling instrument is aligned with the reference target of the leveling staff;
    receiving a third signal at the leveling instrument using the wireless link, the third signal indicating to the leveling instrument to determine the elevation of the point relative to the leveling instrument; and
    automatically determining the elevation of the point relative to the leveling instrument, the elevation of the point determined by a measurement unit of the leveling instrument using a pattern on the leveling staff, wherein the measurement unit is configured to rotate about a second horizontal axis independent of the leveling instrument, the first horizontal axis being different from the second horizontal axis, and the measurement unit and the leveling instrument are configured to rotate about the vertical axis in unison.

10. The method of claim 9 wherein the leveling instrument is positioned less than about 100 meters from the point.

11. The method of claim 9 wherein the elevation of the point relative to the leveling instrument is determined within an accuracy range of less than ±0.2 millimeters when the leveling instrument is positioned less than 100 meters from the point.

12. The method of claim 9 wherein the leveling instrument tracks movement of the leveling staff by tracking movement of the reference target.

13. The method of claim 9 wherein the reference target includes a reflective portion, and the leveling instrument emits light and detects light reflected from the reflective portion to track movement of the leveling staff.

14. The method of claim 9 wherein the leveling instrument comprises a digital level.

15. A method of determining an elevation of a point relative to a leveling instrument using a leveling staff, the leveling staff positioned at the point and the leveling instrument positioned remote from the point, the method comprising:

sending a first signal from a controller to the leveling instrument using a wireless link, the first signal indicating to the leveling instrument to automatically track movement of a reference target of the leveling staff as the leveling staff is moved from a first location to the point;

sending a second signal from the controller to the leveling instrument using the wireless link, the second signal indicating to the leveling instrument to:

automatically align an alignment unit of the leveling instrument with the reference target of the leveling staff, wherein the alignment unit is configured to rotate about a first horizontal axis independent of the leveling instrument, and the alignment unit and the leveling instrument are configured to rotate about a vertical axis in unison, and automatically determine the elevation of the point relative to the leveling instrument, the elevation of the point determined by a measurement unit of the leveling instrument using a pattern on the leveling staff, wherein the measurement unit is configured to rotate about a second horizontal axis independent of the leveling instrument, the first horizontal axis being different from the second horizontal axis, and the measurement unit and the leveling instrument are configured to rotate about the vertical axis in unison; and receiving a third signal at the controller using the wireless link, the third signal sent from the leveling instrument and providing the elevation of the point relative to the leveling instrument.

16. The method of claim 15 further comprising:

receiving a fourth signal at the controller using the wireless link, the fourth signal sent from the leveling instrument and indicating that the alignment unit is aligned with the reference target of the leveling staff.

17. The method of claim 15 wherein an elevation of a second point is determined relative to the leveling instrument using a second leveling staff different from the leveling staff, the second leveling staff positioned at the second point and the leveling instrument positioned remote from the second point, the method further comprising:

sending a fourth signal from the controller to the leveling instrument using the wireless link, the fourth signal indicating to the leveling instrument to automatically align the alignment unit with a reference target of the second leveling staff, and indicating to the leveling instrument to automatically determine the elevation of the second point relative to the leveling instrument, the elevation of the second point determined by the measurement unit using a pattern on the second leveling staff.

* * * * *